United States Patent [19]

Neugebauer et al.

[11] Patent Number: 4,553,858

[45] Date of Patent: Nov. 19, 1985

[54] BOTTOM PLATE FOR A BUSHING MOUNTED VIA ROLLING ELEMENTS ON A PIN

[75] Inventors: Steffen Neugebauer, Hesselbach; Gunter Scharting, Gochsheim, both of Fed. Rep. of Germany

[73] Assignee: Fag Kugelfischer Georg Schafer (KGaA), Fed. Rep. of Germany

[21] Appl. No.: 659,331

[22] Filed: Oct. 10, 1984

[30] Foreign Application Priority Data

Oct. 15, 1983 [DE] Fed. Rep. of Germany ....... 3337602

[51] Int. Cl.$^4$ .............................................. F16C 33/66
[52] U.S. Cl. ............................ 384/473; 308/DIG. 3; 384/563
[58] Field of Search ............... 384/473, 462, 563, 486; 308/DIG. 3; 464/128

[56] References Cited

U.S. PATENT DOCUMENTS

| | | | |
|---|---|---|---|
| 3,070,980 | 1/1963 | Slaght | 464/128 |
| 3,832,865 | 9/1974 | Lewis | 384/473 |
| 4,325,593 | 4/1982 | Mallet | 308/DIG. 3 |
| 4,512,679 | 4/1985 | Petrzelka et al. | 464/128 |

FOREIGN PATENT DOCUMENTS 7035694  9/1970  Fed. Rep. of Germany .

Primary Examiner—Lenard A. Footland
Attorney, Agent, or Firm—Ostrolenk, Faber, Gerb & Soffen

[57] ABSTRACT

A bottom plate for emplacement in a bushing having an opening defined by an internal peripheral side wall and a bottom of the bushing. A pin, like the pin of a universal joint cross piece, is received in the opening of the bushing with rollers around the periphery of the pin for permitting rotation of the pin in the opening of the bushing. The bottom plate is disposed between the bottom end of the pin and the bottom of the bushing. Radially extending lubricant distribution grooves are defined in the bottom plate. First ones of the grooves extend over the region beneath the bottom end of the pin along the side of the bottom plate opening toward the pin. Second ones of the grooves extend over the region of the bottom plate beneath the rollers along the side of the plate and opening toward the bottom of the bushing. A step-like transition is defined between the first and the second ones of the grooves in the bottom plate. Centering projections are defined around the periphery of the plate for cooperating with the transition region between the bottom and peripheral side wall of the bushing. The peripheral edge of the edge of the pin may also be chamfered.

15 Claims, 1 Drawing Figure

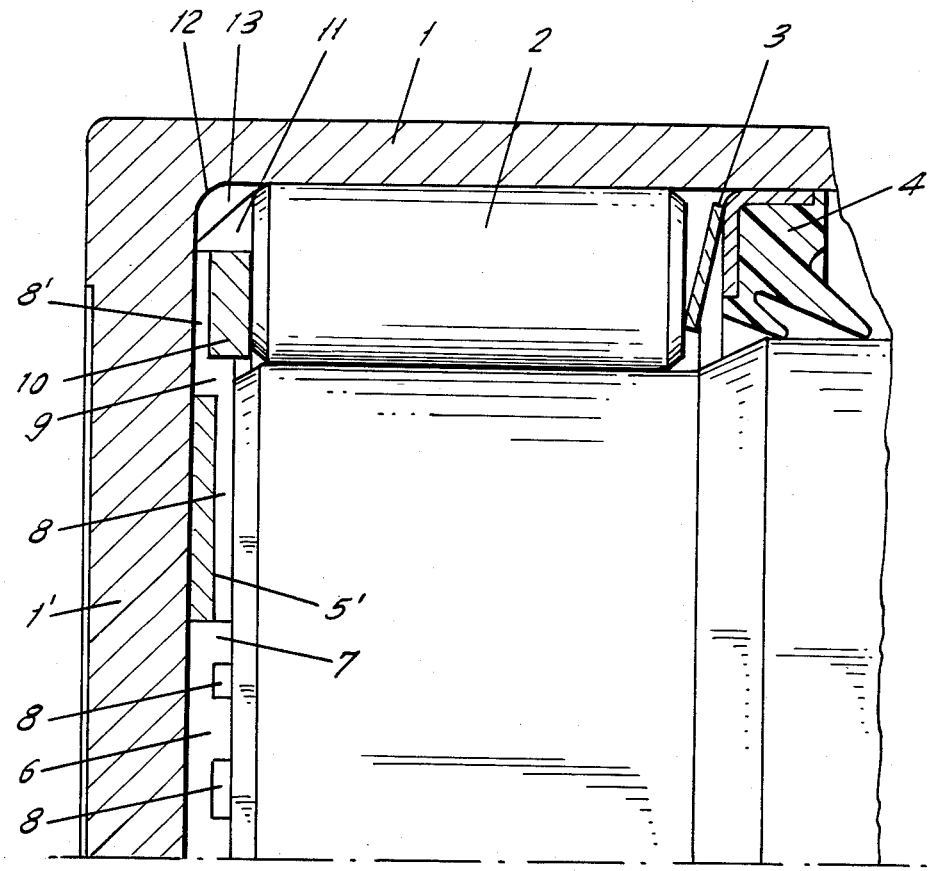

BOTTOM PLATE FOR A BUSHING MOUNTED VIA ROLLING ELEMENTS ON A PIN

BACKGROUND OF THE INVENTION

The present invention relates to a bushing which receives a pin, and more particularly to a bottom plate inside the bushing beneath the bottom end of the pin. Such a bushing and pin combination may be used for the pin of a cross piece of a universal joint, although it is not limited to this.

The pin inside the bushing has a bottom end which is the end that extends into the open receptacle of the bushing. The bushing has a peripheral side wall and a bottom which defines the receptacle for the end of the pin. Where the pin is movable relative to the bushing, as in a universal joint, a set of rolling elements or rollers, usually cylindrical rollers, are disposed around the pin, with their axes parallel to the pin axis, for rolling engagement between the pin and the interior wall of the bushing, at the bottom end of the pin. Lubrication of such a pin-in-bushing combination is desirable, and this can be accomplished quite well through a well-designed bottom plate between the bottom end of the pin and the bottom of the bushing.

A bottom plate for a bushing that is disposed over the end of a pin is known from Federal Republic of Germany Utility Model No. 70 35 694. Such a bushing may be disposed on the pin of a universal joint, for example. The bottom plate shown there is provided on both of its sides with lubricating grooves, whereby sufficient lubrication can come into the region of the peripheral wall of the bushing. But, an additional part is still necessary, namely a cup spring which urges the rollers at their upper axial ends toward the bottom of the bushing. Upon relubrication of the bushing, the lubricant, taking the path of least resistance, will probably pass through the grooves which are located between the end of the pin and the bottom plate. It then enters the region of the wall of the bushing and into the space containing the rolling elements, but only if a cup spring is provided. The grooves which are located on the rear soon become closed as this represents the longer path. Furthermore, there is no relative movement here between the bottom plate and the bottom of the bushing. This stationary condition favors closure at this place.

SUMMARY OF THE INVENTION

Therefore, it is the object of the invention to improve the bottom plate so that, upon relubrication of the pin in the bushing, an exchange of the lubricant takes place throughout practically the entire space occupied by the rolling elements, with as few parts as possible.

The bottom plate is disposed between the bottom end of the pin and the bottom of the bushing. There are rollers around the bottom end portion of the pin for rolling contact with the periphery of the pin and the internal peripheral side wall of the bushing opening. The bottom plate is of a width to extend close to the interior periphery of the bushing.

The bottom plate includes in a plurality of radially extending grooves. In the radial portion of the bottom plate that is between the end of the pin and the bottom of the bushing, first ones of the grooves in the plate run along and open toward the bottom of the pin. In the radial portion of the bottom plate that is between the bottom axial ends of the rollers and the bottom of the bushing, second ones of the grooves in the plate run along and open toward the bottom of the bushing. The first and second grooves run along the opposite sides of the plate. A step-like transition is defined in the plate between the first and the second ones of the grooves. That transition is generally located in the radial region of the periphery of the pin. Preferably, a respective first one of the grooves which is radially more inward extends radially into a respective second one of the grooves which is radially more outward through a respective one of the step-like transitions.

The transition within the bottom plate assure the end-surface lubrication of the pin and also assure that the lubricant moves into the radially outer region in which the rolling-elements are disposed. The lubricant moves diagonally through the rolling-element space, thereby effecting practically complete replacement of the lubricant.

The pin, at the junction between its bottom end and its periphery, also has a chamfer which enables diversion of some of the lubricant moving radially outward of the pin to the region that is on a radially inward side of the rolling-elements at the pin.

There are a plurality of projections spaced around the periphery of the bottom plate which permit simplified centering of the bottom plate in the bushing. This enables accurate insertion of the bottom plate at the generally rounded transition between the bushing wall and the bushing bottom. The projections have an external chamfer at that transition to fit there.

DESCRIPTION OF THE DRAWING

Other objects and features of the invention will be explained with reference to the accompanying drawing which shows a partial cross section through a pin of a universal joint showing one half that pin, at the end of that pin.

DESCRIPTION OF THE PREFERRED EMBODIMENT

The invention is described for the pin of a universal joint (not shown), but may be useful in other lubricated applications. At the pin of the joint, the universal joint comprises the bushing 1, which is part of one fork (not shown) of the joint, the pin 5 of the cross-piece (not shown) of the joint, the rollers 2 between the exterior of the pin and the interior of the bushing to permit them to relatively rotate, the cup spring 3 for pressing upon the upper ends of the rollers and urging them against the bottom plate 6, the packing 4 which holds in and biases the cup spring and which seals the upper end region of the rollers against lubricant leakage, and the bottom plate 6 between the end of the pin and the bottom of the opening in the bushing.

The bottom plate 6 has a borehole 7 in the region of its axis. Lubricant is pumped into the bushing through an inlet (not shown) which delivers lubricant to the borehole 7. From the borehole radiate a plurality of radially directed grooves 8. In the region of the end 5' of the pin 5 which is the radially more inward area of the plate 6, the grooves extend over open alongside the end 5'. In the region around the outer peripheral wall of the pin 5, a step-like transition 9, stepped away from the pin end 5', is provided. Adjoining the transition 9 and extending radially outward of it beneath the bottom ends of the rollers are the grooves 8', which extend over and open alongside the bottom 1' of the bushing 1. The grooves 8' extend radially out to the vicinity of the peripheral wall surface of the bore of the bushing 1.

When lubricant is forced or pumped in at the borehole 7, the lubricant first passes into the grooves 8. This assures a well-lubricated application of the end 5' of the pin 5 against the bottom plate 6. A small amount of lubricant then passes inside the annular chamfered part 10 of the bottom plate 6, into the space in which the rolling elements 2 are located. This forces away the old lubricant present in this region. The greater part of the new lubricant, however, flows through the transition 9 and the grooves 8' and enters into the rolling-element space, within the outer region.

On the upper axial side of the rollers 2 opposite the cup spring 3, a free passage for the lubricant is left free only in the inner region of the rollers 2 and the lubricant is thereby forced diagonally through the roller space. In this way, practically complete replacement of the old lubricant by the new lubricant is assured, together with the above-described feeding of lubricant within the radially inner region of the rollers 2.

Projections 11 are distributed around the periphery of the bottom plate for centering the bottom plate 6 in the bushing 1. The free spaces between the projections 11 assures easy passage of the lubricant. Because the transition 12 between bushing 1 and the bushing bottom 1' is generally rounded, a chamfer 16 is provided on the projections 11.

The passage of the lubricant is clear. There are no sections in the bushing which can become obstructed. Therefore, even after long periods of time and frequent relubrication, the original optimal lubrication is retained.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A bottom plate for a bushing, which bushing has an opening in it for receiving the end portion of a pin, and wherein there are rolling elements around the periphery of the pin between the pin and the interior peripheral wall of the bushing;
   the bottom plate being of a width to extend close to the interior peripheral wall of the bushing;
   a plurality of radially extending grooves defined in the bottom plate;
   between the bottom end of the pin and the bottom of the bushing, first ones of the grooves defined in the plate run along and open toward the bottom end of the pin; between the ends of the rollers and the bottom of the bushing, second ones of the grooves in the plate run along and open toward the bottom of the bushing;
   a step-like transition defined in the plate between the first and the second ones of the grooves and the transition being generally radially located in the region of the periphery of the pin.

2. The bottom plate of claim 1, wherein a respective first one of the grooves radially extends into a respective second one of the grooves at a respective one of the step-like transitions.

3. The bottom plate of claim 1, further comprising a plurality of projections distributed around the periphery of the plate for extending toward the interior peripheral wall of the bushing for positioning the bottom plate in the bushing.

4. The bottom plate of claim 3, wherein the bushing has a transition region between the internal periphery and the bottom thereof, and the projections on the bottom plate have a chamfer in the region of that transition.

5. In combination,
   a pin with a periphery and a generally flat bottom end adjoining the periphery;
   a bushing, including an interior peripheral side wall, a bottom joined to the peripheral side wall at a transition region and defining within the peripheral side wall and the bottom of the bushing an opening for receiving the bottom end of the pin and the adjoining peripheral region of the pin;
   rolling elements disposed between the internal side wall of the bushing and the periphery of the pin toward the bottom end of the pin for permitting relative rotation of the pin in the opening of the bushing; and
   a bottom plate in the bushing between the bottom end of the pin and the bottom of the bushing;
   the bottom plate being of a width to extend close to the interior peripheral side wall of the bushing;
   a plurality of radially extending grooves defined in the bottom plate;
   between the bottom end of the pin and the bottom of the bushing, first ones of the grooves defined in the plate run along and open toward the bottom end of the pin; between the ends of the rollers and the bottom of the bushing, second ones of the grooves in the plate run along and open toward the bottom of the bushing;
   a step-like transition defined in the plate between the first and the second ones of the grooves and the transition being generally radially located in the region of the periphery of the pin.

6. The combination of claim 5, wherein a respective first one of the grooves radially extends into a respective second one of the grooves at a respective one of the step-like transitions.

7. The combination of claim 5, further comprising a plurality of projections distributed around the periphery of the plate for extending toward the interior peripheral wall of the bushing for positioning the bottom plate in the bushing.

8. The combination of claim 7, wherein the bushing has a transition region between the internal periphery and the bottom thereof, and the projections on the bottom plate having a chamfer in the region of that transition.

9. The combination of claim 8, wherein the pin is chamfered where the bottom end of the pin meets the periphery of the pin.

10. The combination of claim 9, wherein the rolling elements are generally cylindrical rollers and each has an axial end facing toward the bottom of the bushing.

11. The combination of claim 5, wherein the pin is chamfered where the bottom end of the pin meets the periphery of the pin.

12. The combination of claim 5, wherein the rolling elements are generally cylindrical rollers and each has an axial end facing toward the bottom of the bushing.

13. The combination of claim 12, further comprising spring means biasing the rollers toward the bottom of the bushing.

14. The combination of claim 13, further comprising a seal in the bushing around the pin and beyond the axial end of the rolling elements away from the bottom of the bushing and beyond the spring for sealing the bushing.

15. The combination of claim 5, further comprising a hole passing through the bottom plate in the region of the central axis thereof.

* * * * *